(12) United States Patent
Della Fiorentina et al.

(10) Patent No.: US 9,827,948 B2
(45) Date of Patent: Nov. 28, 2017

(54) ANTI-THEFT DEVICE FOR A STEERING COLUMN OF A MOTOR VEHICLE

(71) Applicant: U-SHIN FRANCE SAS, Creteil (FR)

(72) Inventors: Alix Della Fiorentina, Creteil (FR); Nicolas Pichelin, Creteil (FR); Patrice Poggi, Creteil (FR)

(*) Notice: Subject to any disclaimer, the term of this patent is extended or adjusted under 35 U.S.C. 154(b) by 0 days.

(21) Appl. No.: 14/915,274

(22) PCT Filed: Sep. 3, 2014

(86) PCT No.: PCT/EP2014/068762
§ 371 (c)(1),
(2) Date: Feb. 29, 2016

(87) PCT Pub. No.: WO2015/032832
PCT Pub. Date: Mar. 12, 2015

(65) Prior Publication Data
US 2016/0207498 A1 Jul. 21, 2016

(30) Foreign Application Priority Data
Sep. 4, 2013 (FR) ...................................... 13 58452

(51) Int. Cl.
*B60R 25/021* (2013.01)
(52) U.S. Cl.
CPC .. *B60R 25/02123* (2013.01); *B60R 25/02131* (2013.01)
(58) Field of Classification Search
CPC ......... B60R 25/02115; B60R 25/02118; B60R 25/02123; B60R 25/02126; B60R 25/02131; Y10T 70/5664; Y10T 70/5956
See application file for complete search history.

(56) References Cited

U.S. PATENT DOCUMENTS

| | | | | |
|---|---|---|---|---|
| 4,487,042 A | * | 12/1984 | Mochida | ........... B60R 25/02142 70/186 |
| 4,516,415 A | | 5/1985 | Kobayashi et al. | |

(Continued)

FOREIGN PATENT DOCUMENTS

| | | |
|---|---|---|
| FR | 2 967 115 A1 | 5/2012 |
| FR | 3 010 029 A1 | 3/2015 |

OTHER PUBLICATIONS

International Search Report issued in corresponding application No. PCT/EP2014/068762 dated Oct. 1, 2014 (4 pages).

(Continued)

*Primary Examiner* — Laura Freedman
(74) *Attorney, Agent, or Firm* — Osha Liang LLP

(57) ABSTRACT

The invention relates to a lock for an anti-theft device for a motor vehicle steering column comprising a rotor (5), a stator head (4), a lug (13) and a complementary profile (14), one supported by the rotor (5) and the other by the stator head (4), the complementary profile (14) being shaped such that the engagement of same with the lug (13) blocks the rotation of the rotor (5) in a predetermined direction of rotation (AR) from a predetermined angular position (PIA) and allows the rotation of the rotor (5) by pushing the rotor (5) in beforehand. The complementary profile (14) is also shaped so that the engagement of the complementary profile (14) and the lug (13) guides the assembly of the rotor (5) in the stator head (4) according to a push-rotated assembly in which the rotor (5) is axially retained in the stator head (4).

9 Claims, 5 Drawing Sheets

(56) References Cited

U.S. PATENT DOCUMENTS

Figure 1:
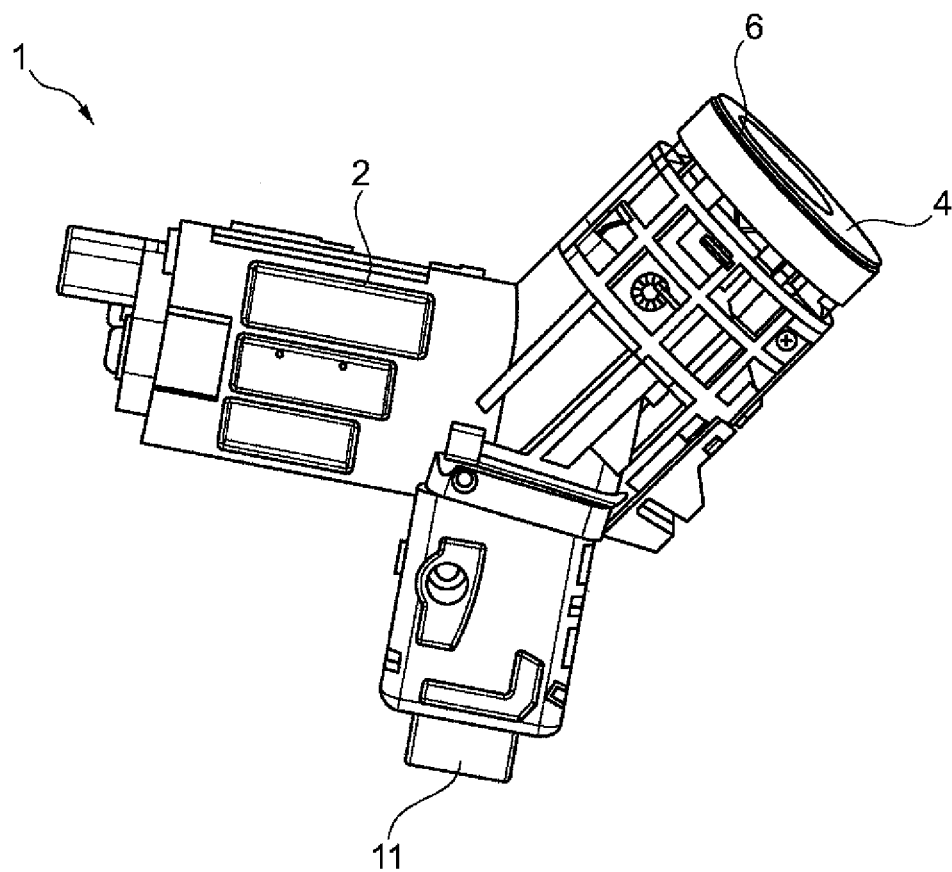

| | | | |
|---|---|---|---|
| 5,289,707 A | 3/1994 | Suzuki | |
| 6,354,117 B1* | 3/2002 | Canard | B60R 25/02121 |
| | | | 70/186 |
| 2016/0257285 A1* | 9/2016 | Poggi | B60R 25/02115 |

OTHER PUBLICATIONS

Written Opinion issued in corresponding application No. PCT/EP2014/068762 dated Oct. 1, 2014 (6 pages).

\* cited by examiner

ANTI-THEFT DEVICE FOR A STEERING COLUMN OF A MOTOR VEHICLE

TECHNICAL FIELD

The present invention relates to the field of locks and antitheft devices for the steering column of motor vehicles.

PRIOR ART

The means for locking antitheft devices comprises a bolt mounted so as to be able to move between a retracted position in which the bolt is held at a distance from a steering column and a projecting position in which it locks the steering column of the motor vehicle. The key conforming to the lock makes it possible to release the locking means of the motor vehicle.

In an improved version of this device, the key cannot be extracted from the lock by a simple withdrawal movement in the stopped position. It is necessary first to press the key into the lock in order then to be able to extract it therefrom. Thus any unwanted or malevolent extraction of the key is prevented, in particular because of the danger that the extraction of the key represents when the vehicle is running. In particular the grasping of the key during transportation by a child transported on a front seat of the vehicle is prevented.

Nevertheless, the mechanisms provided at the present time for obtaining the aforementioned functionalities are relatively complex to assemble and expensive.

DISCLOSURE OF THE INVENTION

One aim of the invention is to provide a mechanism that is simpler to assemble and less expensive for obtaining these functionalities.

To this end, the subject matter of the present invention is a lock for an antitheft device for the steering column of a motor vehicle, comprising:
  a rotor,
  a stator head,
  a lug and a complementary profile, one carried by the rotor and the other by the stator head, the complementary profile being shaped so that the engagement of same with the lug blocks the rotation of the rotor in a predetermined direction of rotation from a predetermined angular position and allows the rotation of the rotor by pushing the rotor in beforehand,
  characterised in that the complementary profile is also shaped so that the engagement between the complementary profile and the lug guides the mounting of the rotor in the stator head according to a push-rotated assembly in which the rotor is axially retained in the stator head.

Thus the same lug is used for two separate functions: the lug engages with the complementary profile in order to force the driver to press the rotor before the withdrawal of the key while the lug engages with the complementary profile for the simple mounting of the rotor in the stator head. In this way two separate functionalities are obtained in a simple fashion and at less cost.

Furthermore, the lock is more compact compared with those of the prior art.

According to an example embodiment, the lock comprises an elastic element configured so as to thrust axially on the rotor.

According to an example embodiment, the lug or the complementary profile is arranged on the side of the rotor head intended to receive the key.

According to an example embodiment, the lug is carried by the stator head and the complementary profile is carried by the rotor. This is because producing the complementary profile on the external periphery of the rotor, for example by injection, is easier to achieve than at the internal periphery of the stator head.

According to an example embodiment, the complementary profile has:
  an axial entry groove, emerging at one end of the rotor, and
  a lateral groove in communication with the entry groove, the lateral groove having an axial stop for axially retaining the rotor in the stator head by engagement with the lug.

According to an example embodiment, the entry groove is arranged so as to cooperate with the lug in an angular position of the rotor distinct from the angular positions that the rotor can adopt by rotation of a key.

According to an example embodiment, the lateral groove comprises a portion shaped as a pressing-in ramp for axially pressing the rotor into the stator head by engagement with the lug when the rotor is rotated in the stator head in a rotation direction opposite to the predetermined rotation direction and the axial stop comprises a portion axially recessed opposite to the portion shaped as a pressing-in ramp.

According to an example embodiment, the lateral groove comprises a radial stop for blocking the rotation of the rotor by engagement with the lug, when the rotor is rotated in the predetermined rotation direction from the predetermined angular position.

According to an example embodiment, the predetermined angular position is an intermediate position.

SUMMARY DESCRIPTION OF THE DRAWINGS

Figure 2:
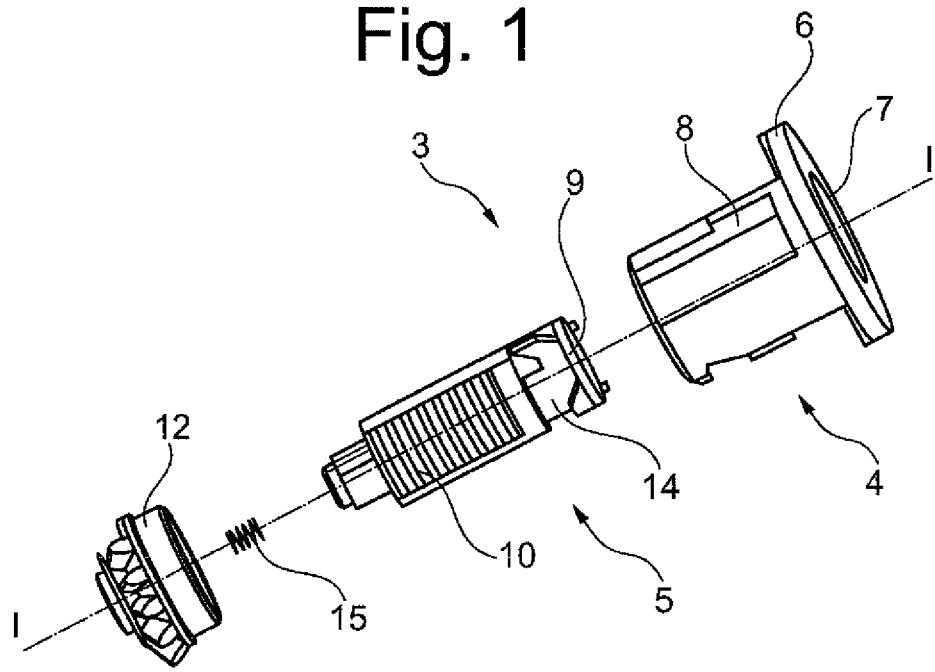
Figure 3:
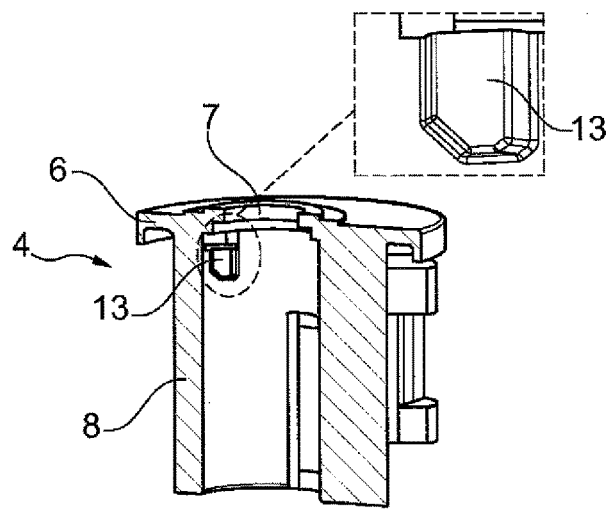
Figure 4:
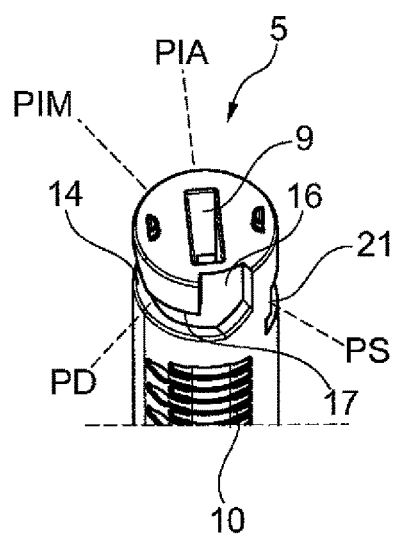
Figure 5:
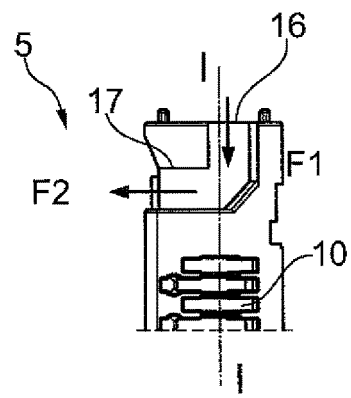
Figure 6:
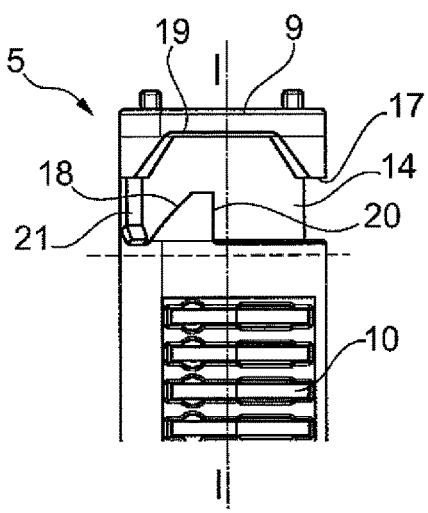
Figure 7:
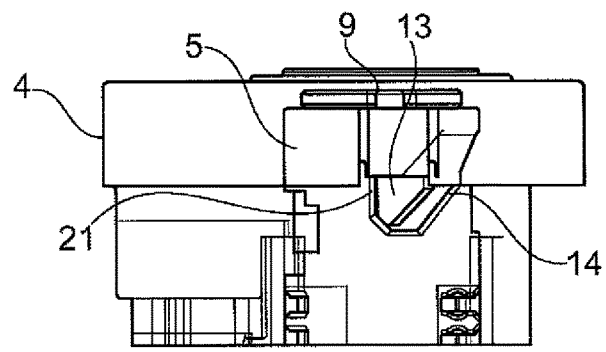
Figure 8:
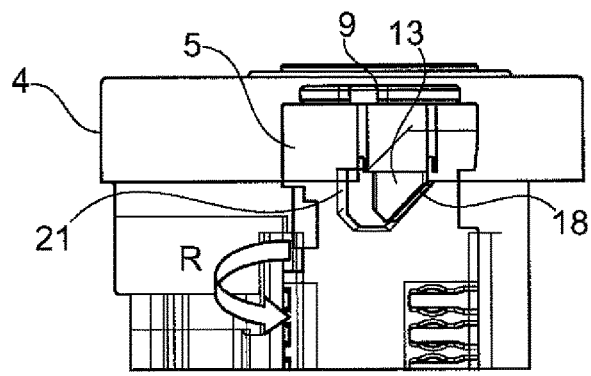
Figure 9:
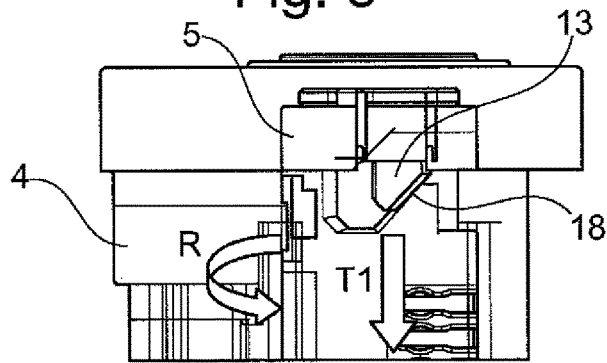
Figure 10:
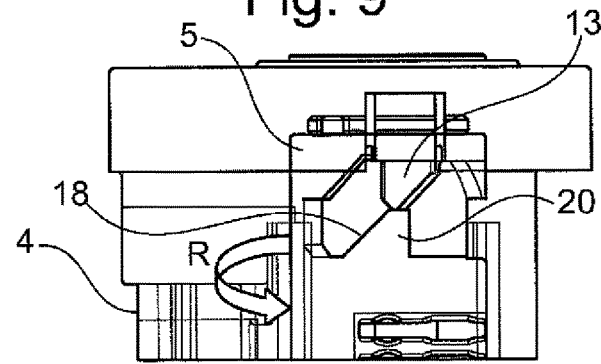
Figure 11:
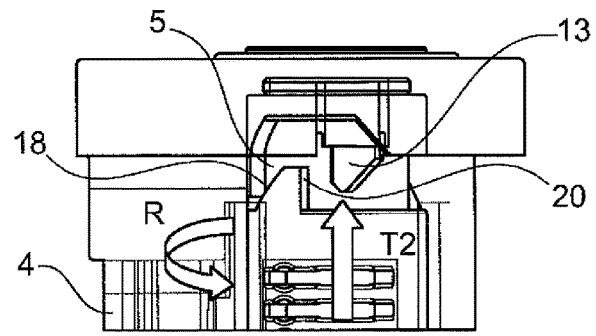
Figure 12:
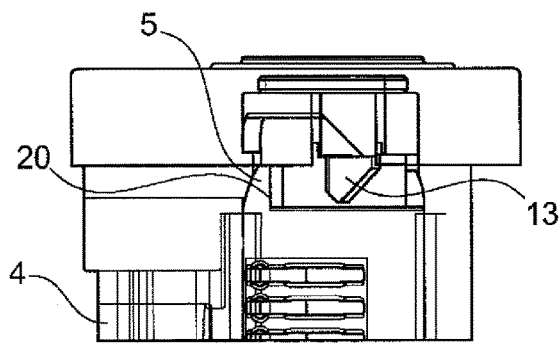
Figure 13:
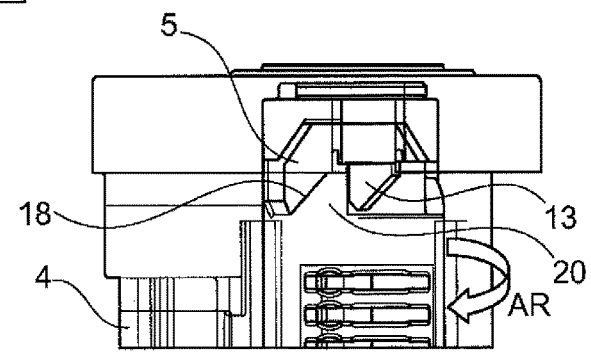
Figure 14:
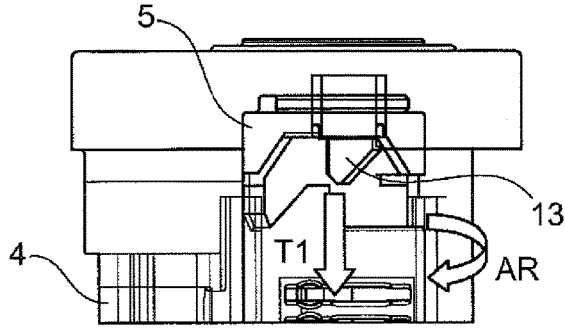
Figure 15:
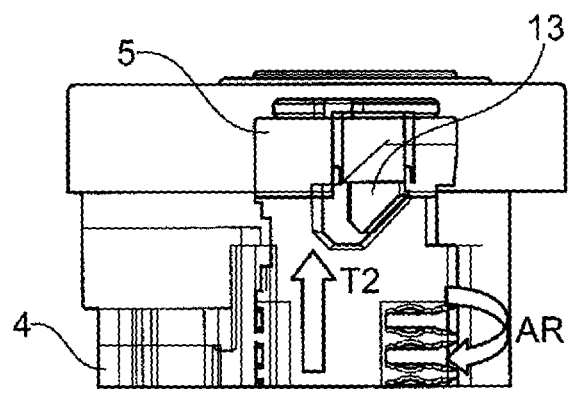

Other advantages and features will emerge from a reading of the description of the invention as well as on the accompanying figures, which depict a non-limitative example embodiment of the invention and on which:

FIG. 1 depicts a perspective view of an antitheft device for a motor vehicle steering column, FIG. 2 depicts an exploded view of the lock of the antitheft device of FIG. 1, FIG. 3 depicts a view in cross section of the stator head of the lock of FIG. 2 and an enlarged view of the lug of the stator head, FIG. 4 depicts a partial perspective view of the front end of the rotor of the lock of FIG. 2, FIG. 5 depicts a perspective side view of the front end of the rotor of FIG. 4, FIG. 6 depicts a partial perspective view of the front end of the rotor of FIG. 5 that is turned through approximately 180°, FIG. 7 depicts an enlarged view of elements of the lock of FIG. 2 in the assembled state, the stator head being depicted in transparency with the rotor in the neutral position, FIG. 8 depicts a view similar to FIG. 7, when a key is introduced into the lock and the rotor begins to turn, FIG. 9 depicts a view similar to FIG. 8, the rotor turning while being pushed in, FIG. 10 depicts a view similar to FIG. 9 with the rotor in the pressed-in position, FIG. 11 depicts a view similar to FIG. 10, the rotor continuing to turn, FIG. 12 depicts a view similar to FIG. 11 with the rotor in an intermediate position, FIG. 13 depicts a view similar to FIG. 12, the rotor being blocked with respect to rotation, FIG. 14 depicts a view similar to FIG. 13, the driver pressing on the rotor, and FIG. 15 depicts a view similar to FIG. 14, the rotor being returned to the position in which it is not pressed in.

In these figures, the identical elements bear the same reference numbers.

DETAILED DESCRIPTION

FIG. 1 illustrates an antitheft device 1, with an insertable lock, intended to be mounted in a motor vehicle for protecting the steering. The antitheft device 1 comprises an antitheft body 2 inside which a lock 3 is intended to be inserted and secured.

As can be seen better in FIG. 2, the lock 3 comprises a stator head 4 inside which a rotor 5 is able to move in axial rotation about the rotation axis I-I by rotation of a key for controlling a means for locking the antitheft device 1.

The stator head 4 is intended to be secured to the antitheft body 2. At the front, the stator head 4 has a cover 6 in which a circular opening 7 is provided for affording access to the rotor head 5. Behind the cover 6, the stator head 4 has a housing 8, for example roughly cylindrical in shape, for receiving the rotor 5.

The rotor 5 has a key entry 9 provided at the front end (or head). It should be understood that, in the whole of this text, the term rotor designates very generally any subassembly comprising a rotor body through which there are provided radial slots 10 able to receive tumblers that are mounted so as to be able to move in radial translation and are coupled to return springs permanently driving them into positions projecting with respect to the rotor body.

According to an example embodiment, the rotation of the key is able to cause the rotation of the rotor 5 into a first neutral extreme angular position, called the neutral position, as the "stop" position, two intermediate angular positions, referred to as "on" and "accessories" positions, and a second extreme angular position, opposite to the first neutral extreme angular position, referred to as the "start" position.

The neutral, intermediate and start positions follow each other when the rotor 5 is moved from the neutral position towards the start position. After its passage through the start position, the rotor 5 is elastically returned by a return spring to its intermediate on position.

The locking means comprises a bolt 11 mounted so as to be able to move between a retracted position in which the bolt 11 is held at a distance from a steering column (not shown) and a projecting position (FIG. 1) in which it blocks the steering column of the motor vehicle.

For this purpose, the lock 3 comprises a cam 12, constrained so as to rotate with the rotor 5 (FIG. 2), so that the rotation of the rotor 5 makes it possible to control the translation of the bolt 11.

The bolt 11 is generally in a projecting position in the steering column when the rotor 5 is in the neutral position and the key withdrawn from the rotor 5, the bolt 11 being held inside, in the retracted position, in the other angular positions of the rotor 5. The bolt 11 is thrust into the projected position by a bolt spring.

The lock 3 further comprises a lug 13 and a complementary profile 14, one carried by the rotor 5 and the other by the stator head 4, as well as an elastic element 15 (FIGS. 2 and 3).

The elastic element 15 is arranged at the rear end (or tail) of the rotor 5 and is configured so as to thrust on the rotor 5 axially. The elastic element 15 is for example a compression spring. It is for example interposed between the cam 12 and the tail of the rotor 5. The elastic element 15 is mounted coaxially between the cam 12 and the rotor 5. The rotor 5 is thus in sliding connection with the cam 12, that is to say the rotor 5 is connected to the cam 12 with respect to rotation but not translation, the elastic element 15 impelling the rotor 5 into the position in which it is not pushed in.

To facilitate the production of the lock 3, the lug 13 is carried by the stator head 4 and the complementary profile 14 is provided in the rotor 5. More precisely, the complementary profile 14 is provided for example on the side of the rotor head 5 intended to receive the key.

The lug 13 is therefore fixed. It is for example made in one piece with the stator head 4 (FIG. 3).

The complementary profile 14 is shaped so that its engagement with the lug 13 blocks the rotation of the rotor 5 in a predetermined direction of rotation from a predetermined angular position, and allows the rotation of the rotor 5 by prior pushing in of the rotor 5.

By this means, the key cannot be extracted from the lock 3 by a simple withdrawal movement in the stop position. It is necessary first to push the key into the lock 3 in order then to be able to extract it therefrom. In this way any unwanted or malevolent extraction of the key is prevented, in particular because of the danger that the extraction of the key represents when the vehicle is running.

The complementary profile 14 is also shaped so that the engagement between the complementary profile 14 and the lug 13 guides the mounting of the rotor 5 in the stator head 4 in accordance with an assembly of the push-rotated type in which the rotor 5 is axially held in the stator head 4. Although retained in the stator head 4, the rotor 5 can be pushed into the stator head 4. The assembly of the push-rotated type may also be designated by a mounting of the bayonet type.

Thus the same lug 13 is used for two separate functions: the lug 13 cooperates with the complementary profile 14 in order to force the driver to push in the rotor 5 prior to the withdrawal of the key while the lug 13 engages with the complementary profile 14 for the simple mounting of the rotor 5 in the stator head 4. In this way two separate functionalities are obtained in a simple fashion and at less cost. Furthermore, the lock 3 is more compact compared with those of the prior art.

According to an example embodiment visible in FIGS. 4 and 5, the complementary profile 14 has an entry groove 16 extending axially and emerging at the front end of the rotor 5. The complementary profile 14 also has a lateral groove communicating with the entry groove 16. The lateral groove starts by extending at right angles to the entry groove 16, for example in the predetermined direction of rotation (anticlockwise in the example). This form of the complementary profile 14 guides the mounting of the rotor 5 in the stator head 4 in accordance with an assembly of the push-rotated type.

The flank of the lateral groove situated on the same side as the front of the rotor 5 has an axial stop 17. The axial stop 17 holds the rotor 5 axially in the stator head 4 by engagement with the lug 13 while enabling the rotor 5 to be pushed in.

The entry groove 16 is arranged so as to engage with the lug 13 in an angular position of the rotor 5 distinct from the angular positions that the rotor 5 can adopt by rotation of the key. Thus FIG. 4 depicts the stop PS, accessories intermediate PIA, on intermediate PIM and start PD positions with reference to the angular positions of the rotor 5 engaging with the lug 13 when the rotor 5 is rotated.

The lateral groove also comprises a portion shaped as a pressing-in ramp 18 (FIG. 6), the slope of which increases in the direction of the head of the rotor 5 in a rotation direction opposite to the predetermined rotation direction (referred to as the clockwise rotation direction in the rest of the description). Similarly, the axial stop 17 comprises an axially recessed portion 19 opposite to the portion shaped as a pressing-in ramp 18. The portion of the lug 13 engaging with the portion formed as a pressing-in ramp 18 of the complementary profile 14 has for example a slanting profile, with the same inclination as the slope of the ramp.

When the rotor 5 is rotated in the stator head 4 in the clockwise rotation direction, the portion shaped as a pressing-in ramp 18 presses the rotor 5 axially into the stator head 4.

The lateral groove also comprises a radial stop 20 (FIG. 5) for blocking the rotation of the rotor 5 by engagement with the lug 13, when the rotor 5 is rotated in the anticlockwise rotation direction from the predetermined angular position. The radial stop 20 is arranged after the portion formed as a pressing-in ramp 18 in the clockwise rotation direction.

The predetermined angular position is for example an intermediate position, such as the "accessories" intermediate position.

The complementary profile 14 may also comprise a supplementary radial stop 21, corresponding to the stop position. The engagement between the lug 13 and the supplementary radial stop 21 blocks the rotation of the rotor 5 in the anticlockwise rotation direction. The supplementary radial stop 21 is thus for example arranged opposite to the entry groove 16 of the complementary profile.

In operation, on the lateral groove of the complementary profile 14, the lug 13 is urged against the complementary profile 14 by the elastic element 15, the rotation of the rotor 5 causing the rotor 5 to slide in the stator head 4 through the engagement of the lug 13 with the complementary profile 14.

An example of functioning of the lock will now be described with reference to FIGS. 5 to 15.

When the lock 3 is mounted, the rotor 5 is inserted head first, axially in the housing 8 of the stator head 4 so that the lug 13 of the stator head 4 is inserted in the entry groove 16 of the complementary profile 14 of the rotor 5 (arrow F1 in FIG. 5). Then the rotor 5 is turned in the stator head 4 so that the lug 13 slides in the lateral groove of the complementary profile 14 (arrow F2). The axial stop 17 then holds the rotor 5 axially in the stator head 4 by engagement with the lug 13. The rotor 5 is thus assembled in the stator head 4 in accordance with an assembly of the push-rotated type.

The rotor 5 is turned for example as far as the stop position, that is to say until the lug 13 comes into abutment with the supplementary radial slot 21, at the end of the lateral groove of the complementary profile 14. Then the lock 3 is inserted in the antitheft body 2 and secured to the latter. The antitheft device 1 is then mounted on the steering column of the motor vehicle.

It is assumed, with reference to FIG. 7, that the vehicle is stopped and that the driver introduces the key into the rotor 5 in order to start the vehicle. The lock 3 is then in the stop angular position PS indicated by the arrow P1 in FIG. 4. The lug 13 is in abutment against the supplementary radial stop 21 and against the axial stop 17. The rotation of the rotor 5 is blocked in the anticlockwise direction, that is to say the user cannot turn the key in the anticlockwise rotation direction beyond the stop position. It is only in this configuration that the key can be introduced into the lock 3 or be extracted therefrom along the axis I-I. As soon as the rotor 5 leaves this position, extraction of the key is impossible.

Then the user starts to turn the key in the clockwise rotation direction, turning the rotor 5 in the stator head 4 in the direction of the arrow R in FIG. 8.

The lug 11 then comes into contact with the portion shaped as a pushing-in ramp 18 of the complementary profile 14, which progressively pushes the rotor 5 axially into the stator head 4 counter to its elastic return (arrow T1 in FIG. 9).

At the end of a flat at the end of the portion formed as a pushing-in ramp 18, the rotor 5 and therefore the radial stop 20 are offset towards the inside of the lock 3, so that the radial stop 20 does not prevent the rotation of the rotor 5 in the clockwise direction (FIG. 10).

Then, after passing the radial stop 20, and as the complementary profile 14 does not offer an obstacle, the elastic element 15 returns the rotor 5 to its initial position in which it is not pushed in (arrow T2; FIG. 11) until the lug 13 is in abutment in the axial stop 17.

Then, assuming that the rotation of the rotor 5 has continued, the rotor 5 reaches the "accessories" intermediate position PIA (FIG. 13). In this axial position and in the on PIM and start PD intermediate positions, the axial stop 17 holds the rotor 5 axially in the stator head 4 by engagement with the lug 13.

From the accessories intermediate position PIA, when the driver turns the key in the opposite direction (anticlockwise rotation direction), rotation of the rotor 5 is prevented by the lug 13 being in abutment against the radial stop 20 (arrow AR; FIG. 14). It is therefore not possible to turn the rotor 5 from the accessories intermediate position PIA in order to make it regain the stop position and remove the key.

In this abutment position, the driver must then press the rotor 5 into the stator head 4 (arrow T1 in FIG. 15) in order to offset the radial stop 20 towards the inside of the lock 3, enabling the radial stop 20 to be passed (FIG. 15).

Before reaching the stop position PS, the rotor 5 returns to the initial position in which it is not pushed in, under the effect of the elastic return element 13 (arrow T2; FIG. 16) until the lug 13 is put in abutment in the axial stop 17.

Then the driver continues to turn the rotor 5 as far as the supplementary radial stop 20 in order to reach the stop position (FIG. 7). The driver can then extract the key.

The invention claimed is:

1. A lock for an antitheft device for a steering column of a motor vehicle, comprising:
   a rotor;
   a stator head; and
   a lug and a complementary profile, one carried by the rotor and the other by the stator head, the complementary profile being shaped so that an engagement of the complementary profile with the lug blocks rotation of the rotor in a predetermined direction of rotation from a predetermined angular position and allows the rotation of the rotor by pushing the rotor in beforehand,
   wherein the complementary profile is also shaped so that the engagement between the complementary profile and the lug guides an insertion process of pushing the rotor in the stator head according to a push-rotated assembly in which the rotor is axially retained in the stator head, and a rotation process of rotating the lug in the complementary profile.

2. The lock according to claim 1, further comprising an elastic element configured so as to thrust on the rotor axially.

3. The lock according to claim 1, wherein the lug or the complementary profile is arranged on a side of a head of the rotor intended to receive a key.

4. The lock according to claim 1, wherein the lug is carried by the stator head and the complementary profile is carried by the rotor.

5. The lock according to claim 4, wherein the complementary profile has:
   an axial entry groove, emerging at one end of the rotor, and
   a lateral groove in communication with the entry groove, the lateral groove having an axial stop for axially retaining the rotor in the stator head by engagement with the lug.

6. The lock according to claim 5, wherein the entry groove is arranged so as to engage with the lug in an angular position of the rotor distinct from angular positions (PS, PIA, PIM, PS) that the rotor can adopt by rotation of a key.

7. The lock according to claim 5, wherein the lateral groove comprises a portion formed as a pressing-in ramp for axially pressing the rotor into the stator head by engagement with the lug when the rotor is rotated in the stator head in a rotation direction opposite to the predetermined direction of rotation and wherein the axial stop comprises a portion axially recessed opposite to the portion formed as the pressing-in ramp.

8. The lock according to claim 5, wherein the lateral groove comprises a radial stop for blocking the rotation of the rotor by engagement with the lug, when the rotor is rotated in the predetermined direction of rotation from the predetermined angular position.

9. The lock according to claim 1, wherein the predetermined angular position is an intermediate position.

* * * * *